US012566028B2

(12) United States Patent
Stummer et al.

(10) Patent No.: US 12,566,028 B2
(45) Date of Patent: Mar. 3, 2026

(54) CONTINUOUS DRYER HEAT EXCHANGER DEVICE

(71) Applicant: STELA Laxhuber GmbH, Massing (DE)

(72) Inventors: Michael Stummer, Taufkirchen/Vils (DE); Thomas Christian Laxhuber, Massing (DE)

(73) Assignee: STELA Laxhuber GmbH, Massing (DE)

( * ) Notice: Subject to any disclaimer, the term of this patent is extended or adjusted under 35 U.S.C. 154(b) by 848 days.

(21) Appl. No.: 17/939,019

(22) Filed: Sep. 7, 2022

(65) Prior Publication Data

US 2023/0076213 A1 Mar. 9, 2023

(30) Foreign Application Priority Data

Sep. 8, 2021 (DE) ..................... 10 2021 123 192.2

(51) Int. Cl.

*F26B 17/02* (2006.01)
*B08B 3/02* (2006.01)
*B08B 13/00* (2006.01)
*F26B 3/02* (2006.01)
*F26B 25/00* (2006.01)

(52) U.S. Cl.

CPC .............. *F26B 17/02* (2013.01); *B08B 3/022* (2013.01); *B08B 3/024* (2013.01); *B08B 13/00* (2013.01); *F26B 3/02* (2013.01); *F26B 25/007* (2013.01)

(58) Field of Classification Search

CPC ......... B08B 3/022; B08B 3/024; B08B 13/00; F26B 17/02; F26B 3/02; F26B 25/007

See application file for complete search history.

(56) References Cited

U.S. PATENT DOCUMENTS

2003/0164560 A1* 9/2003 Okuda .................... F23J 15/022 261/90
2013/0036923 A1* 2/2013 Faram ..................... B30B 9/121 100/37
2015/0329925 A1* 11/2015 Tsujita ..................... C13K 1/04 127/53

(Continued)

FOREIGN PATENT DOCUMENTS

CN 111536715 A 8/2020
CN 212378603 U 1/2021

(Continued)

OTHER PUBLICATIONS

English Translation of KR20190127037A (Year: 2019).*
English Translation of TWM357206U (Year: 2009).*

*Primary Examiner* — Connor J Tremarche
(74) *Attorney, Agent, or Firm* — Smartpat PLC

(57) ABSTRACT

A continuous dryer heat exchanger device has a plurality of heat exchanger units. Waste air of an associated dryer section of the associated continuous dryer is guided through an individual heat exchanger unit and contaminants from the waste air are deposited in the heat exchanger unit. A cleaning device for cleaning the continuous flow heat exchanger device of the contaminants is thereby provided, which cleaning device has a plurality of cleaning units. An associated heat exchanger unit is to be cleaned by means of the individual cleaning unit. A switching device is provided, by means of which the cleaning units are to be switched in series one after the other.

14 Claims, 3 Drawing Sheets

(56) References Cited

U.S. PATENT DOCUMENTS

| | | | | |
|---|---|---|---|---|
| 2018/0058759 | A1* | 3/2018 | Wie | .......................... F28G 9/00 |
| 2022/0040887 | A1* | 2/2022 | Von Beyer | .......... B29B 17/0036 |

FOREIGN PATENT DOCUMENTS

| | | | | | |
|---|---|---|---|---|---|
| CN | 112747581 | A | | 5/2021 | |
| JP | 5656383 | B | | 1/2015 | |
| KR | 20190127037 | A | * | 11/2019 | ............ B08B 9/032 |
| TW | M357206 | U | * | 5/2009 | |
| WO | 2017090834 | A1 | | 6/2017 | |

* cited by examiner

CONTINUOUS DRYER HEAT EXCHANGER DEVICE

CROSS-REFERENCE TO RELATED APPLICATION

This application claims the benefit of German Patent Application No. 10 2021 123 192.2, filed 8 Sep. 2021, the contents of which is hereby incorporated by reference in its entirety.

TECHNICAL FIELD

The disclosure relates to a continuous dryer heat exchanger device having a plurality of heat exchanger units, wherein waste air of an associated dryer section of the associated continuous dryer is guided through an individual heat exchanger unit and wherein contaminants from the waste air are deposited in the heat exchanger unit.

BACKGROUND

Continuous dryers are dryers in which material to be dried is transported through the dryer continuously or batchwise. Such a dryer is in particular a belt dryer, which conveys the material to be dried through the continuous dryer by means of a belt. The material to be dried, for example sewage sludge, wood shavings, wood chips, RDF (refuse-derived fuel), SSW (solid shredded waste), MSW (municipal solid waste), household waste, grass or agricultural products and by-products, such as sugar beet chips, is initially moist or wet.

The material to be dried is conveyed through the continuous dryer in a transport direction and thereby passes through dryer sections. The dryer sections can for this purpose largely be separate from one another in terms of air flow. Different air streams are thus possible in the dryer sections.

The material is dried by removing moisture therefrom by means of hot air. The hot air is produced by heating in particular air from the environment of the continuous dryer. As the air is heated, the relative humidity of this air falls, the air becomes “drier”. In the continuous dryer, this hot air of low relative humidity then flows through the material to be dried and flows around the constituents thereof.

In order to heat the air to form hot air, energy is of course required. This energy would be discharged from the dryer when the hot air produced flows out as waste air after the material has been dried. Approaches are therefore known for recovering the energy from the waste air. To this end, the waste air is guided through a continuous dryer heat exchanger device, in which energy is removed from the waste air and transferred to another energy carrier, such as in particular supply air. Such supply air can be fresh air which is supplied to the continuous dryer from the environment thereof.

SUMMARY

The problem underlying the disclosure is to provide a continuous dryer heat exchanger device with which, compared to known continuous dryers, a further energy saving is possible.

This problem is solved by a continuous dryer heat exchanger device having a plurality of heat exchanger units, wherein waste air of an associated dryer section of the associated continuous dryer is guided through an individual heat exchanger unit and wherein contaminants from the waste air are deposited in the heat exchanger unit. A cleaning device for cleaning the continuous dryer heat exchanger device of the contaminants is provided, which cleaning device has a plurality of cleaning units. An associated heat exchanger unit is to be cleaned by means of the individual cleaning unit. A switching device is provided, by means of which the cleaning units are to be switched in series one after the other.

A heat exchanger device of a continuous dryer is divided into a plurality of heat exchanger units which are associated with individual regions of the continuous dryer and by which heat energy for each of these regions is then recovered from the waste air. The heat exchanger device so divided into individual heat exchanger units is then provided with a cleaning device, which is likewise divided into individual cleaning units. These cleaning units can be controlled individually by means of a switching device, which switches the cleaning units on and off again sequentially one after the other. The switching device can thus keep only one or at least only a small number of the cleaning units in operation in particular simultaneously. Thus, also only one heat exchanger unit or at least only a small number of heat exchanger units of the heat exchanger device are simultaneously cleaned. The remaining heat exchanger units, on the other hand, meanwhile operate or function normally and thus perform the desired heat recovery. Thus, with the assembly as a whole according to the invention, heat recovery can take place by means of a heat exchanger device and at the same time cleaning of this device can take place even while it is operating.

In the continuous dryer heat exchanger device, the waste air particularly preferably flows in a U-shape through the individual heat exchanger unit. The waste air thereby in particular first flows into the unit from the bottom, so as to then flow in an ascending manner and then subsequently to flow in a descending manner, so that the waste air flows downwards again out of the unit.

For cleaning the continuous dryer heat exchanger device, the at least one cleaning device is preferably configured with at least one washing nozzle for supplying a washing liquid into the associated heat exchanger unit. The washing liquid provides liquid cleaning of the heat exchanger device, by means of which contaminants, such as in particular dust, can very advantageously be washed out of the associated heat exchanger. Water is preferably used as the washing liquid, in particular the condensate that forms, which is separated from the waste air flowing through the heat exchanger device during the energy recovery.

The at least one washing nozzle is preferably movably arranged in a lower region of the associated heat exchanger unit. The washing liquid so sprayed into the heat exchanger unit acts in two directions, on the one hand when it is sprayed in upwards and on the other hand when it flows back downwards. At the same time, the directions of action of the sprayed-in washing liquid are constantly changed by means of the movably arranged washing nozzle and thus an additional cleaning action is achieved.

Alternatively or additionally, the at least one washing nozzle is fixedly arranged in an upper region of the associated heat exchanger unit. The washing liquid delivered by the washing nozzle so arranged then flushes the heat exchanger from top to bottom under the force of its own weight. The fixedly mounted washing nozzle is inexpensive to produce and, because it is implemented wholly without moving parts, is at the same time particularly reliable in operation.

A separating device for separating the contaminants from the washing liquid is preferably further provided in the continuous dryer heat exchanger device according to the invention, which separating device is configured in particular with an endless belt filter. By means of such a separating device, the washing liquid can be conditioned again and used again in a circulation arrangement. The separated contaminants can be supplied back into the continuous dryer, where they then ultimately leave the continuous dryer together with the material to be dried. Accordingly, a return device for returning separated contaminants back into the associated continuous dryer is further advantageous.

In addition, a lye-adding device for adding a lye to the washing liquid is preferably provided. By means of the added lye, the acidity of the washing liquid can be adjusted and the washing liquid can in particular be neutralised. Lyes, or alkaline solutions, are aqueous solutions of metal hydroxides, such as in the present case particularly advantageously sodium hydroxide (soda lye). Aqueous solutions are alkaline when the concentration of hydroxide ions OH− exceeds the concentration of oxonium ions H3O+. The pH is then greater than 7.

A biocide-adding device for adding a biocide to the washing liquid is advantageously further provided. Biocides are chemicals for controlling harmful organisms, such as in the present case in particular fungi and microbes.

Finally, a dispersant-adding device for adding a dispersant to the washing liquid is preferably provided in the continuous dryer heat exchanger device according to the invention. Dispersants, or dispersing agents, are additives which permit or stabilise the dispersion, that is to say the optimal mixing, of at least two phases, or substances, which are actually not miscible. This includes in particular the formation of a suspension, as a type of dispersion. A suspension is a sufficiently stable suspension of very small solids in a liquid.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1:
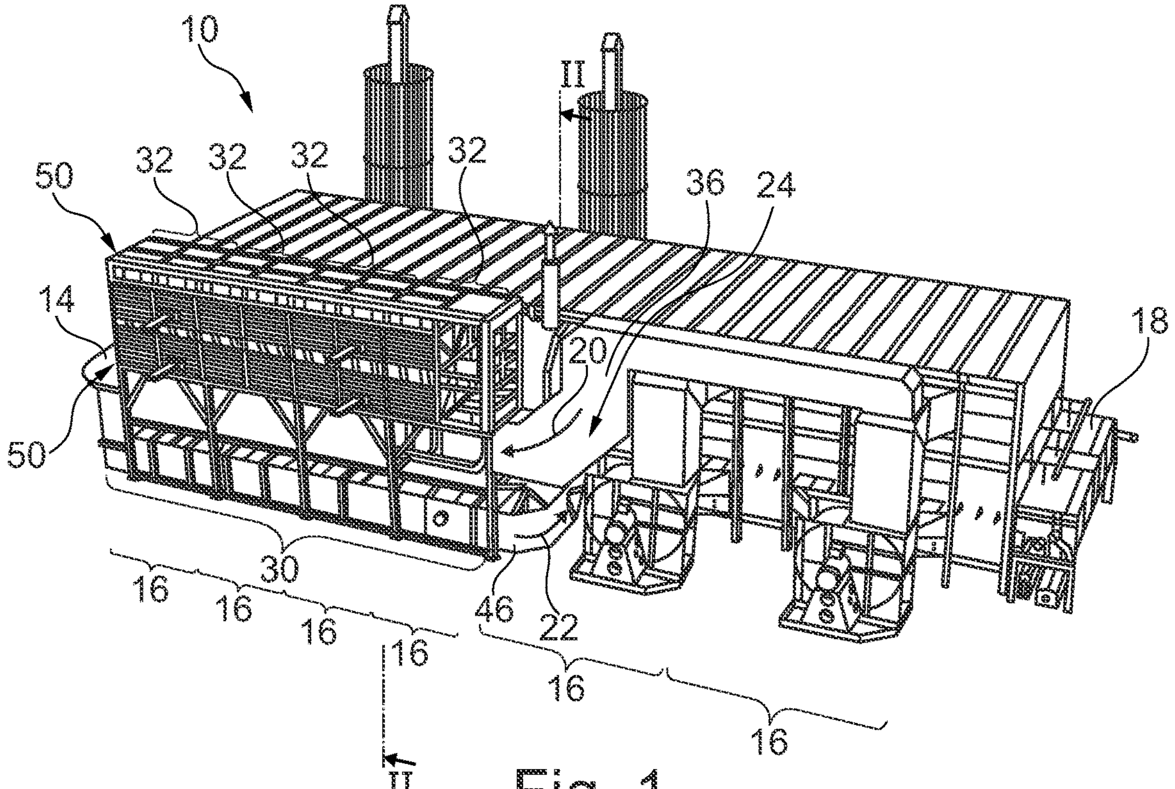
FIG. 1 is a perspective view of a continuous dryer on which an exemplary embodiment of a continuous dryer heat exchanger device according to the invention is mounted.
Figure 2:
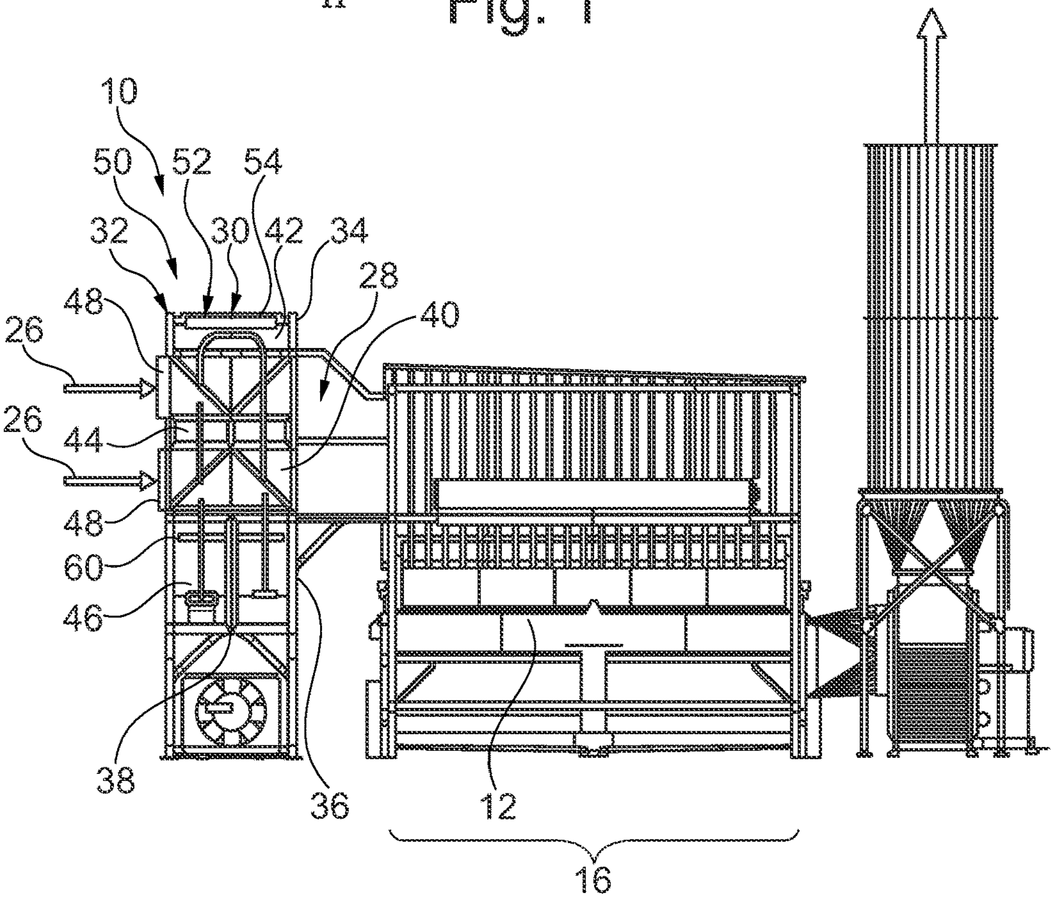
FIG. 2 shows section II-II according to FIG. 1 through in particular one heat exchanger unit.
Figure 3:
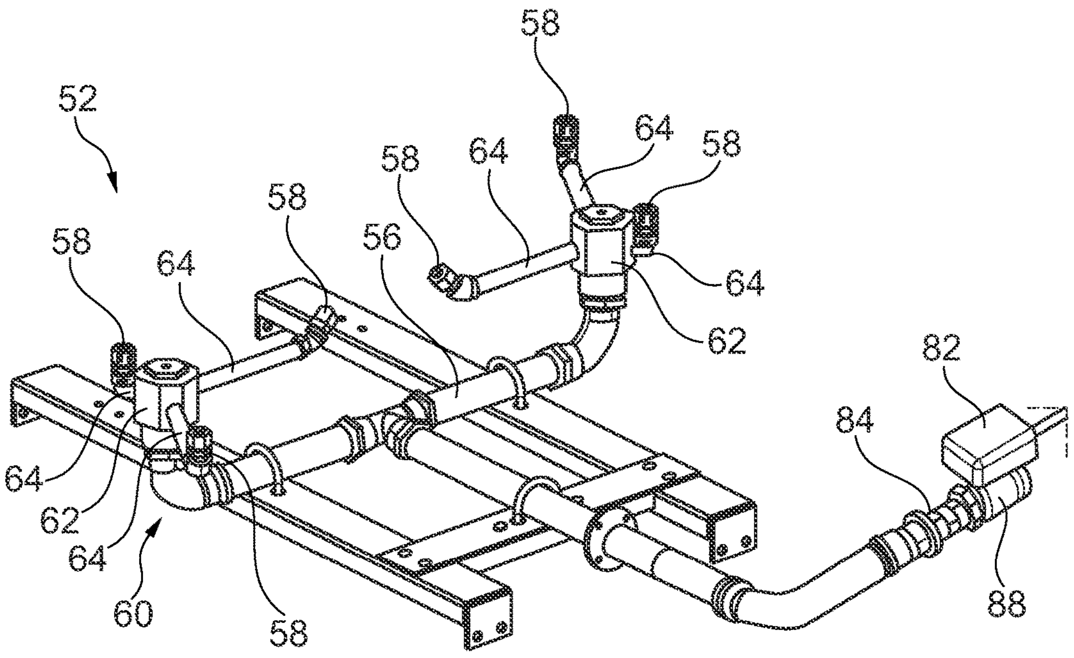
FIG. 3 is a perspective view of a cleaning device for supplying a washing liquid, mounted in a lower region of an associated heat exchanger unit according to FIG. 2.
Figure 4:
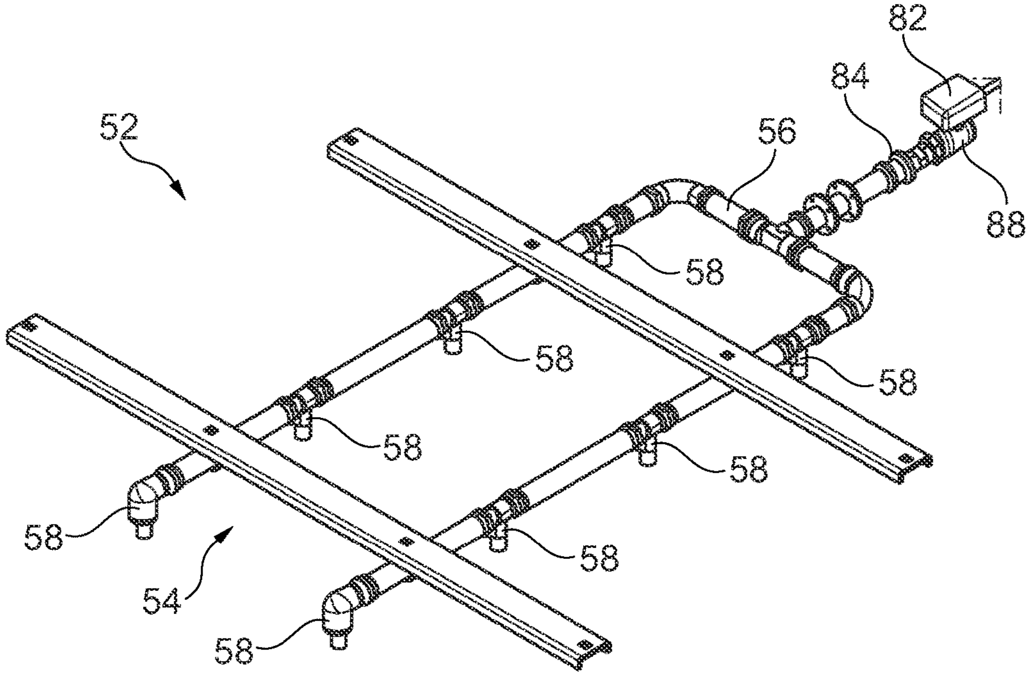
FIG. 4 is a perspective view of a cleaning device for supplying a washing liquid, mounted in an upper region of an associated heat exchanger unit according to FIG. 2.
Figure 5:
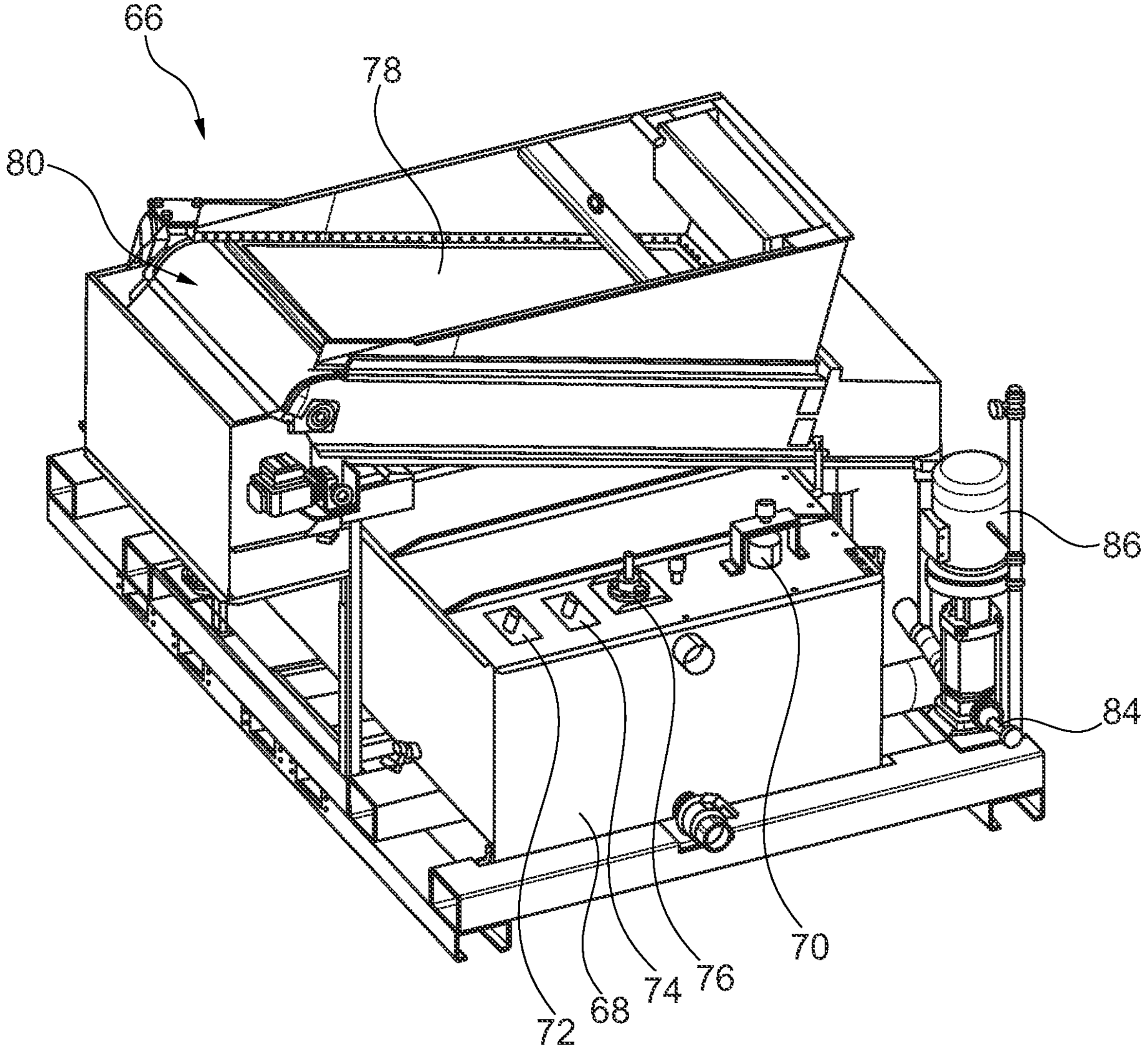
FIG. 5 is a perspective view of a separating device for separating contaminants from the washing liquid.

FIGS. 1 and 2 show a continuous dryer 10 which is used for drying a material to be dried (not shown), in the present case a bulk material in the form of wood chips, sawdust, RDF, etc. The material is in the form of a layer on a revolving transport belt 12, wherein it is applied to the transport belt 12 at a material feed 14, then passes on the transport belt 12 through a plurality of dryer sections 16 and finally is removed from the transport belt 12 again at a material delivery 18.

For drying, drying air is guided through the material to be dried and the transport belt located beneath it, which drying air is discharged in the lower region as recirculating air or waste air 20 from the dryer sections 16 located at the rear in the transport direction and is then returned to the upper region of those dryer sections 16 as return air 22 by means of a circulating-air guide 24. At the same time, fresh air 26 is supplied by means of an air supply 28 to the upper region of dryer sections 16 located at the front in the transport direction. This fresh air 26 thereby flows through a continuous dryer heat exchanger device 30, through which the waste air 20 is guided at the same time. Heat energy of the waste air 20 is thereby returned to the fresh air 26, wherein at the same time moisture from the material that has accumulated in the waste air 20 is condensed out.

The continuous dryer heat exchanger device 30 is configured with a plurality of heat exchanger units 32, which individually have a housing 34 which is largely separate in terms of flow and is connected to a waste air channel 36 for the waste air 20. The waste air 20 thereby passes from the waste air channel 36 in a lower housing region 38 into the housing 34 and into an ascending, in particular vertical housing region 40 located therein. In an upper housing region 42 located downstream in the flow direction, the waste air 20 is then further diverted in a U-shape into a descending housing region 44, which is likewise in particular vertical, until it finally passes in the lower housing region 38 as return air 22 into a circulating-air supply channel or return air channel 46 again. At the same time, a fresh air channel 48 is formed by means of heat exchanger surfaces (not shown in detail) transversely and in particular horizontally through the ascending housing region 40 and the descending housing region 44, through which fresh air channel fresh air 26 is supplied as explained above.

A cleaning device 50 for cleaning in particular the mentioned heat exchanger surfaces is provided on the continuous dryer heat exchanger device 30, which cleaning device is formed by individual cleaning units 52. These cleaning units 52 are each assigned individually to a heat exchanger unit 32 and are configured on the upper side of the upper housing region 42 by means of an upper washing nozzle assembly 54. This upper washing nozzle assembly 54 is configured with a pipeline 56 for supplying washing liquid (not shown) to a total of eight fixed washing nozzles 58. The individual cleaning unit 52 is further configured on the underside of the lower housing region 38 with a lower washing nozzle assembly 60, in which a washing liquid is guided by means of a pipeline 56 to two rotators 62, which are individually configured with three radially directed rotator arms 64 of different lengths. At the radially outer end regions of each of these rotator arms 64 there is then a washing nozzle 68 which is thus rotatable. Of the three washing nozzles 58, two are directed substantially vertically upwards, while the third washing nozzle 58 is directed obliquely in the direction of rotation of the associated rotator 62 and thus acts as the rotary drive therefor.

The washing liquid delivered by means of the washing nozzles 58 passes due to gravity into the lower housing region 38, whereby the heat exchanger surfaces are flushed and cleaned. From the lower housing region 38, the washing liquid, which is then loaded with contaminants, is conveyed to a separating device 66, where it can be stored temporarily in a collecting container 68. The collecting container 68 is provided with an agitator 70 for agitating the washing liquid and with a lye-adding device 72 for adding a lye, with a biocide- and/or dispersant-adding device 74 for adding a biocide and/or for adding a dispersant, and optionally with a pH probe 76. Upstream of the collecting container 68 in the flow direction, the separating device 66 is provided with an endless belt filter 78, by means of which the contaminants are to be separated out of the washing liquid. The contaminants are then returned by means of a return device 80 to the material to be dried in one of the dryer sections 16.

The cleaning units 52 associated with the individual heat exchanger units 32 are to be operated in series one after the other, so that in particular in each case only one of the heat exchanger units 32 is cleaned, while the remaining heat exchanger units 32 are at the same time in operation for heat recovery. To this end, the cleaning device 50 is provided with a switching device 82, by means of which in particular washing liquid supplied through a line 84 by a pump 86 can be allocated to each individual cleaning unit 52 by means of a switching valve 88.

Finally, it is noted that all the features which have been mentioned in the application documents and in particular in the dependent claims, despite the formal reference which has been made to one or more specific claims, are to be protected independently, individually or in any desired combination.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE NUMERALS

10 continuous dryer
12 transport belt
14 material feed
16 dryer section
18 material delivery
20 waste air
22 return air
24 circulating-air guide
26 fresh air
28 air supply
30 continuous dryer heat exchanger device
32 heat exchanger unit
34 housing
36 waste air channel
38 lower housing region
40 ascending housing region
42 upper housing region
44 descending housing region
46 return air channel
48 fresh air channel
50 cleaning device
52 cleaning unit
54 upper washing nozzle assembly
56 pipeline
58 washing nozzle
60 lower washing nozzle assembly
62 rotator
64 rotator arm
66 separating device
68 collecting container
70 agitator
72 lye-adding device
74 biocide- and/or dispersant-adding device
76 pH probe
78 endless belt filter
80 return device
82 switching device
84 line
86 pump
88 switching valve

What is claimed is:

1. A continuous dryer heat exchanger device (30), comprising:
a plurality of parallel heat exchanger units (32) configured to receive waste air (20) from at least one dryer section (16) of a continuous dryer (10),
wherein the waste air (20) is separately guided through each of the parallel heat exchanger units (32), and
wherein contaminants from the waste air (20) are deposited in each heat exchanger unit (32);
a cleaning device (50) for cleaning the continuous dryer heat exchanger device (30) of the contaminants,
wherein the cleaning device (50) has a plurality of cleaning units (52),
each associated with a respective heat exchanger unit (32); and
a switching device (82) configured to switch the plurality of cleaning units (52) in series one after another,
whereby one of the parallel heat exchanger units (32) can be cleaned at a time while the remaining parallel heat exchanger units (32) remain in operation.

2. The continuous dryer heat exchanger device according to claim 1,
wherein the waste air (20) flows in a U-shape through each heat exchanger unit (32).

3. The continuous dryer heat exchanger device according to claim 1,
wherein the waste air (20) flows in a U-shape through each heat exchanger unit (32), first in an ascending manner and then in a descending manner.

4. The continuous dryer heat exchanger device according to claim 1,
wherein at least one cleaning unit (52) of the plurality of cleaning units (52) is configured with at least one washing nozzle (58) for supplying a washing liquid into the associated heat exchanger unit (32).

5. The continuous dryer heat exchanger device according to claim 4,
wherein the at least one washing nozzle (58) is movably arranged in a lower region (38) of the associated heat exchanger unit (32).

6. The continuous dryer heat exchanger device according to claim 4,
wherein the at least one washing nozzle (58) is fixedly arranged in an upper region (42) of the associated heat exchanger unit (32).

7. The continuous dryer heat exchanger device according to claim 4, further comprising
a separating device (66) for separating the contaminants from the washing liquid.

8. The continuous dryer heat exchanger device according to claim 7,
wherein the separating device is configured with an endless belt filter (78).

9. The continuous dryer heat exchanger device according to claim 7, further comprising
a return device (80) for returning separated contaminants back into an associated continuous dryer (10).

10. The continuous dryer heat exchanger device according to claim 4, further comprising a lye-adding device (72) for adding a lye to the washing liquid.

11. The continuous dryer heat exchanger device according to claim 4, further comprising a biocide-adding device (74) for adding a biocide to the washing liquid.

12. The continuous dryer heat exchanger device according to claim 4, further comprising a dispersant-adding device (74) for adding a dispersant to the washing liquid.

13. The continuous dryer heat exchanger device according to claim 1, wherein each heat exchanger unit (32) comprises a housing (34), whereby the plurality of parallel heat exchanger units (32) are flow-separated from one another.

14. The continuous dryer heat exchanger device according to claim 1, wherein fresh air to be heated flows transversely horizontally through each heat exchanger unit (32), and wherein the waste air (20) flows upwardly and downwardly through each heat exchanger unit (32).

* * * * *